Jan. 23, 1923. 1,443,275

F. RADELET.
RAIL TRACK FASTENING.
FILED JULY 13, 1922. 2 SHEETS-SHEET 1

Inventor,
F. Radelet.
By [signature]
Atty.

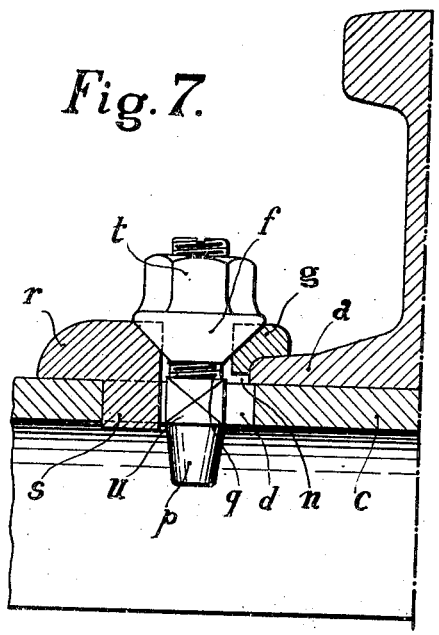
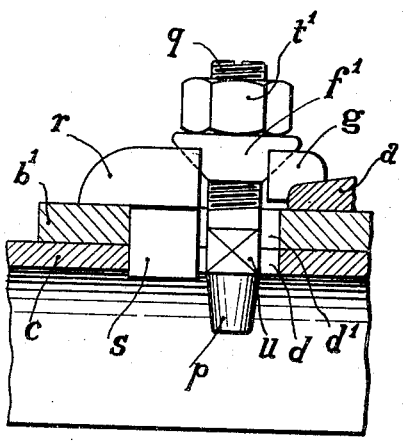
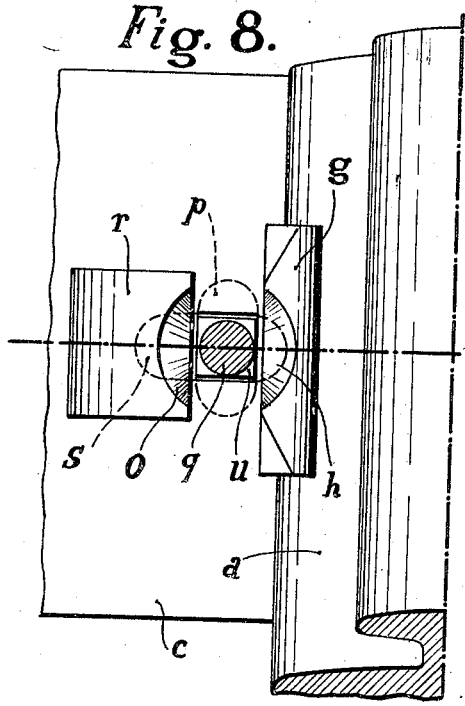
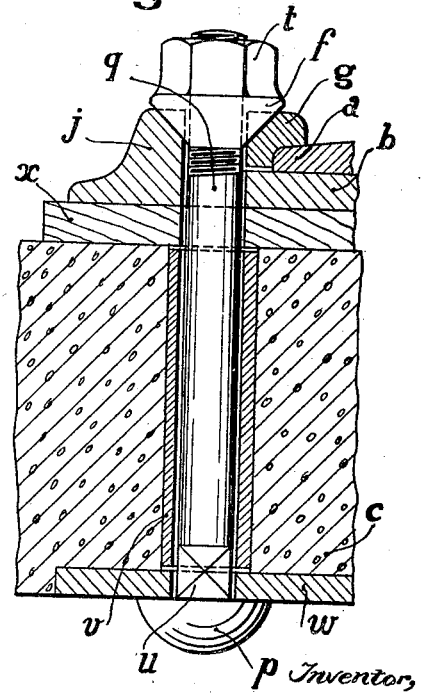
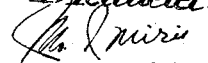

Patented Jan. 23, 1923.

1,443,275

UNITED STATES PATENT OFFICE.

FERNAND RADELET, OF BRUSSELS, BELGIUM.

RAIL-TRACK FASTENING.

Application filed July 13, 1922. Serial No. 574,658.

*To all whom it may concern:*

Be it known that I, FERNAND RADELET, citizen of Belgium, residing at 41 Rue Royale, Brussels, in the Kingdom of Belgium, have invented certain new and useful Improvements in Rail-Track Fastenings, of which the following is a specification.

This invention relates to rail-track fastenings for securing the rails to the sleepers, and it has for its object to provide fastenings of this kind whereby the flange or foot of the rail is firmly and permanently gripped, the stresses being taken up by broad-surfaced parts.

In fastenings in which coach screws or spikes are in direct contact with the flange of the rail, the surface of contact is frequently very small and the concentration of stresses thereon is conducive to undue wear of the screw or bolt and to the shearing of the flange. Moreover when coach screws or spikes are used for securing to the sleepers members such as chairs, clips or the like which have a greater area of contact with the rail, it is difficult to prevent the various parts from becoming slackened by the vibrations of the rail. Finally, further parts are necessary to prevent the rail from creeping longitudinally.

The fastening according to the present invention obviates these disadvantages. It essentially comprises a shoulder and a bearing piece which conforms to the shape of the edge of the flange of the rail and bears on the latter only, the said shoulder and bearing piece being recessed at a suitable point or points to form together an expansible conical seat receiving a conical counterpart which is pressed on to the said seat by a clamping member engaging the sleeper.

According to the nature of the sleeper the shoulder may be integral with the said sleeper, or it may be an embossed portion on a sole-plate located under the flange of the rail, or a removable shoulder held in position by any suitable means. The clamping member may be for instance a coach-screw with a conical head, a bolt with a conical nut or a conical washer combined with an ordinary coach-screw or an ordinary bolt.

When the fastening according to this invention is being clamped in position the conical member forced into the expanding seat acts as a wedge and tends to thrust the bearing piece away from the shoulder, and the said bearing piece presses in an oblique downward direction on the flange of the rail, the vertical component of this force firmly holding the rail onto the sleeper, the horizontal component thereof firmly gripping the rail laterally. Also the shape of the bearing pieces is such that the rail is wedged therebetween and longitudinal creeping is prevented. The bearing piece is preferably slightly curved in order that rattling of the parts be precluded in case their hold on the rail should be somewhat loosened.

The accompanying drawings exemplify some constructions of the fastening according to the present invention.

Figures 7 and 8 show a rail secured to a metal sleeper in sectional elevation on the line C—D of Figure 8 and in plan, partially in section, respectively.

Figure 9 is a partial vertical section through a further construction.

Fig. 10 is a partial vertical section illustrating a flange held in position on a concrete sleeper.

Figure 1:
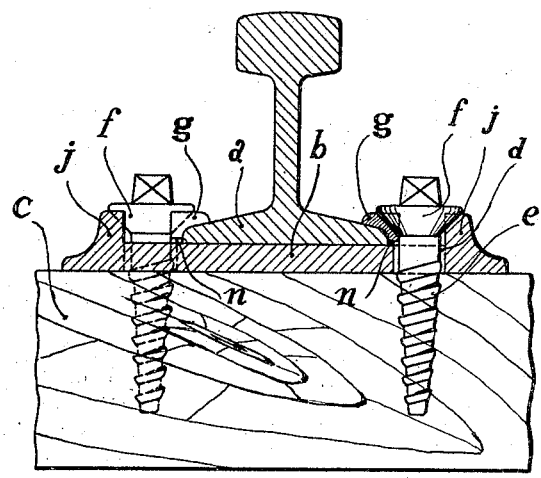
Figure 1 is a sectional elevation on the line A—B of Figure 2.
Figure 2:
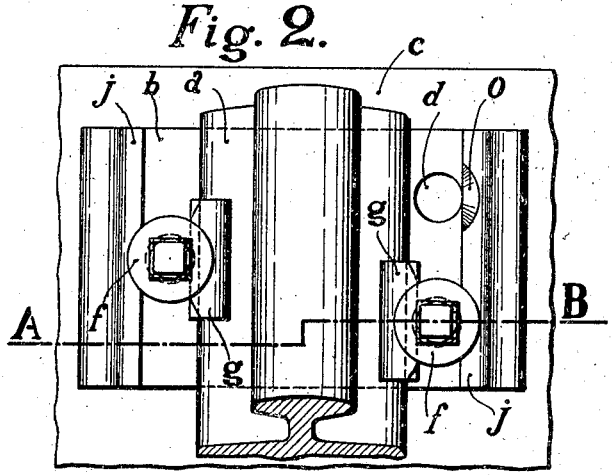
Figure 2 shows in plan a rail secured to a wooden sleeper by means of coach-screws.

Referring to Figure 1, the flange or foot $a$ of the rail is on a sole-plate or tie-plate $b$ resting on the sleeper $c$ and provided with holes $d$ affording passage to the coach-screws $e$. A bearing piece $g$ (Figures 5 and 6) is interpolated between the conical head $f$ of each coach-screw $e$ and the flange $a$ of the rail, a conical recess $h$ being cut on the upper face of the said bearing piece the lower face $i$ of which follows the bend of the edge of the flange $a$. A shoulder $j$ integral with the sole-plate $b$ forms an outer fixed bearing for the head $f$ of the coach-screw $e$ on the opposite side to the bearing piece $g$. Opposite each hole $d$ in the plate $b$, the shoulder $j$, is provided with a recess $o$ (Figure 2) which like the recess $h$ substantially follows the conical face of the head $f$ of the coach-screw. The diameter of the holes $d$ is larger than that of the stem of the coach-screws $e$ so that when the latter are being screwed in position and their conical head $f$ comes in contact with the conical face of one of the recesses $h$ or $o$ the said face serves as a guide to give the coach-screw $e$ its correct position, the said coach-screw reaching its final position only when its head $f$ is wedged between the conical faces of the two recesses. This arrangement has the advantage of gripping the rail very firmly without any of the parts being out of their true position notwithstanding any likely fault due to inaccuracies in the manufacture of the said parts.

Figure 3:
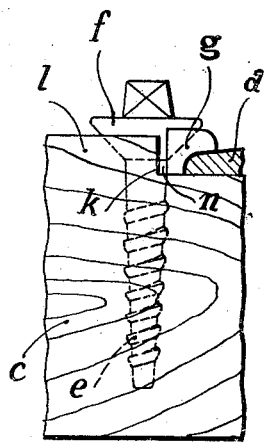
Figure 3 is a partial vertical section showing a modified form of the fastening.

The construction illustrated in Figure 3 differs from that just described in that the flange $a$ of the rail is in direct contact with the sleeper $c$ which is cut at $k$ to form a shoulder $l$ whereon the head $f$ of the coach-screw $e$ takes a bearing. These shoulders $l$ are conically recessed like the shoulders $j$ of the previous construction and they serve the same purpose.

Figures 7 and 8 relate to a fastening to be fitted to metal sleepers provided with a slot $d$. The clamping member comprises a bolt $q$ provided with an elongated foot $p$ and a nut $t$ having a conical base $f$. In this case a removable shoulder $r$ is provided having a lug $s$. The bolt $q$ is caused to engage the slot $d$ of the sleeper, the foot $p$ being placed lengthwise to the said slot and thereafter rotated through 90° and lifted, in order to engage a square portion $u$ of the bolt between the walls of the slot $d$, for the purpose of preventing the said bolt from turning about its axis. The shoulder $r$ is placed in position by inserting the lug $s$ in the free portion of the slot $d$, the bearing piece $g$, being placed on the edge of the flange $a$ whereafter the nut $t$ is tightened in position. The conical base $f$ of the said nut engages the conical recesses $o$ and $h$ of the shoulder $r$ and bearing piece $g$ respectively.

The thickness of the lugs $s$ of the removable shoulders $r$ located on either side of the rail may vary in order to modify the track at the curves by changing over the position of the two removable shoulders of some of the fastenings in order to alter the position of the rails on the sleepers, so that sleepers having uniform slots $d$ may be used.

The nut $t$ provided with a conical base $f$ as illustrated in Figure 7 may of course be replaced by a nut of the usual type such as $t^1$ (Figure 9) which may be tightened onto a conical washer $f^1$ fitting the conical recesses provided therefor.

The fastening of Figure 9 is further differentiated from that of Figure 7 by a sole-plate $b^1$ interpolated between the sleeper $c$ and the flange $a$ of the rail. The square portion $u$ of the bolt $q$ and the lug $s$ of the removable shoulder $r$ engage the slot $d^1$ of the sole-plate $b^1$ and $d$ of the sleeper $c$ so that all the parts are firmly secured in position.

Referring now to the construction illustrated in Figure 10, the bolts $q$ pass through a metal sole-plate $b$, a wooden bearing member $w$ and the concrete sleeper $c$, the holes of which are suitably fitted with a lining $v$. The lower end of the bolt $q$ has a square portion $u$ engaging a square hole of a metal plate $w$ on which the head $p$ of the bolt is caused to rest the plate $w$ seating in a recess in the sleeper $c$ in order to have as wide an area of contact with the sleeper as possible. The threaded end of each bolt receives a nut $t$ the conical base $f$ of which is adapted to fit an expanding conical recess formed as in Figure 1 by the bearing piece $g$ and a shoulder $j$ secured to or integral with the metal sole-plate $b$. The bolts of this construction are placed in position from below the sleeper, but bolts with an elongated foot as shown in Figures 7, 8 and 9 may obviously be used with the aforementioned concrete sleepers. In this connection sole-plates with removable shoulders would be used; also sleepers and plates $w$ provided with slots in which the bolts are inserted from above.

It will be noticed from the foregoing that whatever be the construction of the fastening according to this invention, the bearing piece $g$ is in contact with the flange $a$ of the rail and the conical face $f$ or $f^1$ of the clamping member only. It is indeed essential to provide an appreciable clearance such as $n$ (Figures 1 and 3) in order that the full amount of pressure exerted by the clamping member on the bearing piece $g$ be totally transmitted by the latter to the rail.

Figure 4:
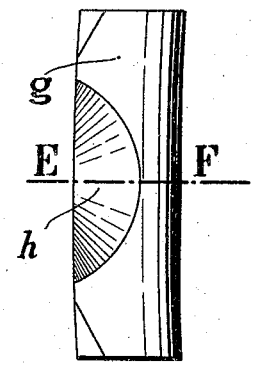
Figures 4, 5 and 6 are respectively a top view, a cross-section on line E—F (Fig. 4), and a side elevation of the bearing piece on a larger scale.
Figure 6:
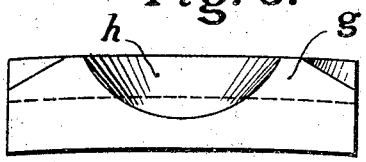
Figure 5:
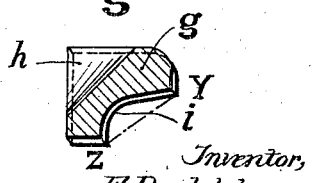

The grip may be further improved by making the bearing piece $g$ of resilient metal and slightly curving the said piece preferably in a plane perpendicular to the arc Y—Z (Fig. 5) forming the face $i$ of the said piece, as indicated in an exaggerated manner in Figures 4, 5 and 6. In this case the pressure exerted by the clamping member flattens the curved face $i$ onto the flange $a$ of the rail so that any slack or play that might occur either in the vertical or horizontal direction owing to the settling of the earth after a time, is automatically compensated for by the bearing piece $g$ which owing to its resiliency tends to take up its initial shape. Rattling of the parts and consequently premature wear thereof are thus precluded.

The normal wear of the parts in contact is reduced owing to the fact that the bearing pieces $g$ divide over large areas the considerable stresses taking place between the rail and the clamping parts. Creeping of the rails is furthermore precluded since any longitudinal shift of the said rail will cause the latter to carry the bearing pieces $g$ with it, but the said pieces owing to their hollowed out shape will become wedged between the flange of the rail and the clamping members $f$ or $f^1$ so that the grip is increased to prevent any shift.

Various modifications can obviously be made to the various constructions of the rail-track fastening hereinbefore described without departing from the scope of the invention.

I claim:

1. In a rail-track fastening, the combination of clamping means adapted to engage a sleeper, a conical face on said means, a fixed shoulder, and a bearing piece adapted to rest on the edge of the flange of a rail, said shoulder and bearing piece being recessed to form together an expansible conical seat for the conical face on said clamping means.

2. In a rail-track fastening, the combination of clamping means adapted to engage a sleeper, a conical face on said means and an expansible conical seat for said conical face comprising a fixed part and a movable part adapted to be clamped solely between said conical face and the edge of the flange of a rail.

3. In a rail-track fastening, the combination of clamping means adapted to engage a sleeper and having a conical face, and an expansible conical seat for said conical face, said seat comprising a fixed part and a movable part conforming to the edge of the flange of a rail and adapted to be pressed obliquely thereagainst by said conical face.

4. In a rail-track fastening, the combination of clamping means adapted to engage a sleeper and having a conical face, and an expansible conical seat for said conical face, said seat comprising a fixed part and a bearing piece adapted to engage the edge of the flange of a rail, said bearing piece having a transverse curvature conforming to the said edge and a slight longitudinal curvature.

5. In a rail-track fastening, the combination of clamping means adapted to engage a sleeper and having a conical face, and an expansible seat for said conical face, said seat comprising a fixed part and a bearing piece adapted to engage the edge of the flange of a rail, said bearing piece having a transverse curvature conforming to the said edge and a slight longitudinal curvature on a plane substantially perpendicular to its transverse curvature.

6. The combination with a rail and a sleeper, of a sole-plate inserted between said rail and sleeper, clamping means adapted to extend through said sole-plate and into said sleeper, said clamping means having a conical face, and an expansible conical seat for said conical face, said seat comprising a fixed shoulder on said sole-plate and a bearing piece adapted to be clamped solely between said conical face and the edge of the flange of said rail.

7. The combination with a rail and a sleeper, of a sole-plate inserted between said rail and sleeper, said sole-plate having a hole, clamping means comprising a bolt adapted to extend through said hole and into said sleeper and a nut having a conical base, and an expansible conical seat for said conical base, said seat comprising a fixed shoulder removably secured in said hole and a bearing piece adapted to be clamped solely between said conical face and the edge of the flange of the rail.

8. As a novel article of manufacture, an elongated piece of metal having its upper face provided with a semi-conical recess and its lower face curved to conform to the edge of the flange of a rail.

9. As a novel article of manufacture, an elongated piece of metal having its upper face provided with a semi-conical recess and its lower face curved transversely to conform to the edge of a rail and longitudinally to increase the resiliency of said piece, said longitudinal curvature being on a plane substantially perpendicular to said transverse curvature.

In testimony whereof I have affixed my signature.

FERNAND RADELET.

Witnesses:
HENRY W. PLUCKER,
LÉON PIÉRARD.